UNITED STATES PATENT OFFICE.

EUGÈNE G. RESSENCOURT, OF ST. LOUIS, MISSOURI, ASSIGNOR TO ELIOT H. CHAMBERLAIN, TRUSTEE, OF ST. LOUIS, MISSOURI.

FRUIT EXTRACT AND PROCESS OF MAKING SAME.

1,001,554.  Specification of Letters Patent.  Patented Aug. 22, 1911.

No Drawing.  Application filed October 26, 1910. Serial No. 589,131.

*To all whom it may concern:*

Be it known that I, EUGÈNE G. RESSENCOURT, a citizen of the United States, residing at the city of St. Louis, Missouri, have invented a certain new and useful Fruit Extract and Process of Making Same, of which the following is such a full, clear, and exact description as will enable any one skilled in the art to which it appertains to make and use the same.

My invention relates to a process of making fruit extracts and its object is to produce an extract that will be highly concentrated and will have a flavor and aroma corresponding to that of the fresh fruit. So far as I am aware, it has been a defect of all prior processes having this general object that the fruit juices only were used in making the extract, and also that various extracting and dissolving agents were used which were deleterious to the character of the product. In carrying out my new process nothing is introduced into the substance treated which must later be removed or which in any way tends to destroy or impair the quality of the resulting extract. I have also discovered certain methods of treatment that add greatly to the efficiency and completeness of the extracting process and to the character and commercial value of the product.

My process consists in a general way of first thoroughly crushing a mixture of the fresh fruit and an approximately equal quantity of a high grade crystallized sugar, and then adding cologne spirit which I have found to be the most suitable solvent of the aromatic substances which I desire to separate from the fruit. I prefer to use sugar in the form of large crystals for the reason that the principal purpose of the sugar is to assist in crushing and separating the parts of the fruit and the crystals as they are being broken up satisfactorily perform this function. The fact that the sugar ultimately dissolves and that its presence really adds to the commercial value of the extract makes it a particularly valuable means for the purpose mentioned. I wish it to be understood, however, that the use of sugar in any form, while desirable is not absolutely essential to the production of a satisfactory extract nor is it essential that the proportion of sugar set forth be used, that amount merely having been found to be preferable.

The mixture is allowed to stand a few days and is then subjected to distilling action by means of which the aromatic substances are separated from the fruit and carried over with the cologne spirit to the condenser. I have found that in beginning the extraction, the temperature of the mixture should be raised gradually to a point somewhat above vaporizing temperature of the spirit and that a suitable temperature to maintain during the process of extraction is about 200° Fahr. Care must be taken that none of the fruit is burned since this would impair the quality of the extract, and to prevent this I usually place the crushed fruit in a perforated strainer suspended within the retort or container. This prevents the fruit from coming into contact with the bottom or sides of the vessel. As an additional protection I also prefer to heat the container over a water bath. This apparatus is described in a co-pending application, Serial No. 589,130 filed Oct. 26, 1910. The distilling action should be continued until the volume of the mixture is reduced to about one-half of its original volume. The residue, which contains the sugar, the coloring matter of the fruit and some undistilled spirit, is then strained, preferably through a double linen cloth and after cooling, is added to the distillate thus giving to it the characteristic color of the fruit treated and producing an extract that corresponds to the fruit in flavor and aroma.

I will now give a particular example of the details of my process: First I take about six gallons of clean fruit from which the extract is to be made, which however, should not have been washed, and cut it into small pieces and add an approximately equal quantity by weight, or about sixty pounds, of rock candy which should preferably be broken into coarse pieces. The fruit and the rock candy are then ground together in a mortar under strong pressure until the rock candy is dissolved. To this mixture, I then add one-half of the quantity by volume or about six gallons of cologne spirit. I then prefer to place this mixture in a glass container having a glass stopper and allow it to stand for at least a week, and it may be allowed to stand for any desired length of time beyond this, if it is more convenient to postpone the final steps of the process. The large quantity of cologne spirit prevents any fermentation. The whole mixture is then subjected to the distilling action and distillation carried on at a temperature of about 200° Fahr. until the volume of the mixture has been reduced about one-half. The residue is then strained and mixed with the distillate.

Having fully described my invention, what I claim as new and desire to secure by Letters Patent of the United States is:

1. The process of making fruit extract which comprises crushing a mixture of sugar and the whole fruit, adding a solvent of aromatic substances, and subjecting the mixture to distilling action.

2. The process of making fruit extract which comprises crushing a mixture of sugar and the whole fruit, adding a solvent of aromatic substances, and subjecting the mixture to distilling action at a temperature of about 200° Fahr.

3. The process of making fruit extract which comprises crushiong a mixture of sugar and the whole fruit, adding a solvent of aromatic substances, subjecting the mixture to a distilling action until the volume is reduced about one-half, straining the residue and mixing it with the distillate.

4. The process of making fruit extract which comprises crushing the fruit with an equal quantity of rock candy, adding one-half by volume of cologne spirit, and subjecting the mixture to distilling action at a temperature of about 200° Fahr.

5. The process of making fruit extract which comprises crushing the fruit with an equal quantity of rock candy, adding one-half by volume of cologne spirit, allowing it to stand, subjecting the mixture to distilling action at a temperature of 200° Fahr. until the volume is reduced one half, straining the residue and mixing it with the distillate.

6. The process of making fruit extract which comprises adding a solvent of aromatic substances to the fruit, subjecting the mixture to distilling action, and mixing the distillate with the liquid portion of the undistilled residue.

7. The process of making fruit extract which comprises adding cologne spirit to the fruit and subjecting the mixture to distilling action.

8. A fruit extract comprising the distillate of a fruit mixture containing the whole fruit and the liquid portion of the undistilled residue.

9. A fruit extract comprising the substance produced by the distillation of a mixture of the fruit with a solvent of aromatic substances, and the liquid portion of the undistilled residue.

10. The herein described fruit extract comprising the distillate of a mixture of the fruit with cologne spirit.

11. The herein described fruit extract comprising coloring matter derived from the fruit, and the distillate of a mixture of the whole fruit with a solvent of aromatic substances.

12. A fruit extract comprising coloring matter derived from the fruit and the distillate of a mixture of the fruit with cologne spirit.

13. The herein described fruit extract composed principally of fruit aroma, cologne spirit, grape spirit and angelica wine.

14. The herein described fruit extract composed chiefly of fruit aroma and coloring matter, sugar, cologne spirit, grape spirit and angelica wine.

In testimony whereof, I have hereunto set my hand and affixed my seal in the presence of the two subscribing witnesses.

EUGÈNE G. RESSENCOURT. [L. S.]

Witnesses:
E. E. HUFFMAN,
ELIZABETH BAILEY.